United States Patent [19]

Oshima et al.

[11] Patent Number: 4,864,542
[45] Date of Patent: Sep. 5, 1989

[54] MEMORY CARTRIDGE HAVING STORED DATA PROTECTING FUNCTION AND MEMORY PROTECTING METHOD

[75] Inventors: Toshio Oshima, Osaka; Tomotaka Ozeki, Toride, both of Japan

[73] Assignee: Hitachi Maxell, Ltd., Osaka, Japan

[21] Appl. No.: 168,436

[22] Filed: Mar. 15, 1988

[30] Foreign Application Priority Data

Mar. 16, 1987 [JP] Japan .................. 62-59000

[51] Int. Cl.[4] .................. G11C 7/00; G11C 11/40
[52] U.S. Cl. .................. 365/189.01; 365/195; 235/382.5
[58] Field of Search .................. 360/60; 365/189, 230, 365/195, 228; 235/382.5

[56] References Cited

U.S. PATENT DOCUMENTS

| 3,473,159 | 10/1967 | Cantrell et al. | 364/200 |
| 3,576,544 | 4/1971 | Cordero, Jr. | 364/200 |
| 4,102,493 | 7/1978 | Moreno | 235/419 |
| 4,183,085 | 1/1980 | Roberts et al. | 364/200 |
| 4,434,471 | 2/1984 | Hildinger | 364/900 |
| 4,458,315 | 7/1984 | Uchenick | 364/200 |
| 4,670,857 | 6/1987 | Rackman | 364/900 X |

FOREIGN PATENT DOCUMENTS

| 54-58012 | 5/1979 | Japan | 360/60 |
| 62-271290 | 11/1987 | Japan | |

Primary Examiner—Stuart N. Hecker
Assistant Examiner—Alyssa H. Bowler
Attorney, Agent, or Firm—Antonelli, Terry & Wands

[57] ABSTRACT

A portable memory cartridge includes a mass memory, a data bus, an address bus, control signal lines for carrying signals for making access to the mass memory, a password memory for storing a flag indicating the inhibition of read/write access to the mass memory, a password memory for storing a particular authorized password, and a comparator for comparing an input password with the particular password set previously. When the comparison results in coincidence, a control signal required for the access is supplied to the mass memory for enabling the access to the mass memory in data read or write mode or data read and write mode.

15 Claims, 6 Drawing Sheets

MEMORY CARTRIDGE HAVING STORED DATA PROTECTING FUNCTION AND MEMORY PROTECTING METHOD

BACKGROUND OF THE INVENTION

The present invention relates generally to a memory unit of the type used as an auxiliary storage device for a computer. More particularly, the invention is concerned with a memory unit having an improved capability of protecting data which is stored in an incorporated memory device during a data read/write operation. The present invention is also concerned with a method of protecting data stored in the memory unit.

As auxiliary storage equipment for a computer, word processor, built-in type machine control computer or the like, there is employed a semiconductor memory unit, including a single or a plurality of semiconductor memory devices, such as a RAM (random access memory), ROM (read-only memory) or the like, which are housed in a case. When a RAM is used as the memory unit, a memory back-up power supply cell is also contained in the memory unit. This type of semiconductor memory unit can be detachably connected (slot-in/slot-out) to a control terminal of the computer by means of a connector so that a data reading/writing operation can be performed on the memory unit by the control terminal. The memory unit is so designed that data written in the memory unit can be maintained even when the memory unit is disconnected from the control terminal.

In this type semiconductor memory unit, it is apparently desirable to protect the data written in the memory from inadvertent erasure and from erroneous rewriting. Further, there are certain applications where it is required to inhibit data from being read out by a third party in order to ensure the confidentiality of the written data.

Under the circumstances, there has been known heretofore a technique according to which an externally manipulatable lock piece or member capable of assuming selectively a first or second state (first or second position) is provided as a part of the case of the semiconductor memory unit. When the semiconductor memory unit is inserted in a control terminal, the latter detects the state (or position) of the manipulatable piece to permit (enable) the data writing operation to the memory unit when the piece is in the first state, while inhibiting the data writing in case the piece is in the second state.

The known data protecting technique mentioned above suffers from a problem in that, because of the external manipulatability of the piece to be set to the first or second state, there may arise the unwanted possibility that the data stored in the semiconductor memory unit could be inadvertently erased or rewritten due to erroneous manipulation of the lock piece.

Further, with the manipulatable lock piece mentioned above, it is impossible to ensure the confidentiality of the stored data by inhibiting with certainty a third party from an attempt to read out the data, because any one can read out the data by correspondingly manipulating the lock piece.

On the other hand, a so-called IC card is a typical type of the memory unit for which a data write/read operation is prohibited. This IC card includes a microprocessor and a semiconductor memory device incorporated integrally in the body of the card, and data referred to as password or ciphered number is previously stored, so that the data write/read operation is permitted only when a password or ciphered number inputted externally coincides with the previously stored password.

Such an IC card is intended to be used as a bankbook or a nominal list, by way of example. To this end, the IC card is provided with an additional function to classify and rearrange the data in addition to the mere data storing function with a view to realizing the storage of data in accordance with preestablished rules of data arrangement. This function can be accomplished by providing the microprocessor on the card.

In contrast, the semiconductor memory unit of concern is a portable auxiliary memory or storage device for a computer which has a large storage capacity and is required only to have the data storage function, since the storage capacity of the semiconductor memory unit can not be utilized effectively if the data classification and rearrangement functions are employed, as in the case of the IC card. Of course, a microprocessor may be incorporated in the semiconductor memory unit for enabling or inhibiting data write/read operations with the aid of a password or ciphered number. In that case, however, the function of the microprocessor is not made use of fully, which is a disadvantage from the economical standpoint. Beside, in light of the requirement imposed on the semiconductor memory unit that it should be compact and have a large storage capacity, incorporation of the microprocessor should be avoided since otherwise the semiconductor memory unit could not be realized in a compact form with a large storage capacity because the microprocessor occupies a large proportion of available space in the semiconductor memory unit. Additionally, the microprocessor is indispensably accompanied by a program for operating it as well as a memory for storing the program, giving rise to a problem that the circuit scale of the semiconductor unit is enlarged, involving increased expenditure. For these reasons, it is undesirable to incorporate the microprocessor in the semiconductor memory unit.

SUMMARY OF THE INVENTION

It is therefore an object of the present invention to provide a semiconductor memory unit or device which can ensure protection of the confidentiality of stored data by adding a circuit of simplified configuration, to thereby solve the problems described above.

Another object of the present invention is to provide a portable type semiconductor memory unit or apparatus having no microprocessor or central processing unit and which is nevertheless capable of inhibiting selectively accesses to the data stored in the memory unit.

It is still another object of the present invention to provide a semiconductor memory cartridge incorporating no microprocessor and having a function to protect the data stored in the semiconductor memory cartridge while enabling selectively read/write accesses which are accompanied with a particular password.

A further object of the present invention is to provide an inexpensive and compact semiconductor memory unit having a large storage capacity in which identification of an inputted password can be realized by a circuit of inexpensive and simple configuration while assuring protection of confidentiality of the stored data as well as protection of the data against destruction.

In view of the foregoing objects, there is provided according to a general aspect of the present invention a semiconductor memory unit or apparatus which includes a memory for storing a password together with a flag for inhibiting or permitting a data read/write mode of operation, a latch for storing temporarily a password inputted externally, and a comparison circuit for comparing the password stored in the memory with that held by the latch upon request of inhibited access for thereby setting the semiconductor memory to a predetermined mode or inhibiting the memory from being set to a predetermined mode. With this arrangement, the data stored in the semiconductor memory unit can be protected against any unauthorized destruction and leakage of confidentiality with a simplified circuit structure without resorting to the use of microprocessor.

DESCRIPTION OF THE PREFERRED EMBODIMENTS

In the following, the present invention will be described in detail in conjunction with the preferred and exemplary embodiments thereof by referring to the accompanying drawings.

Figure 1:
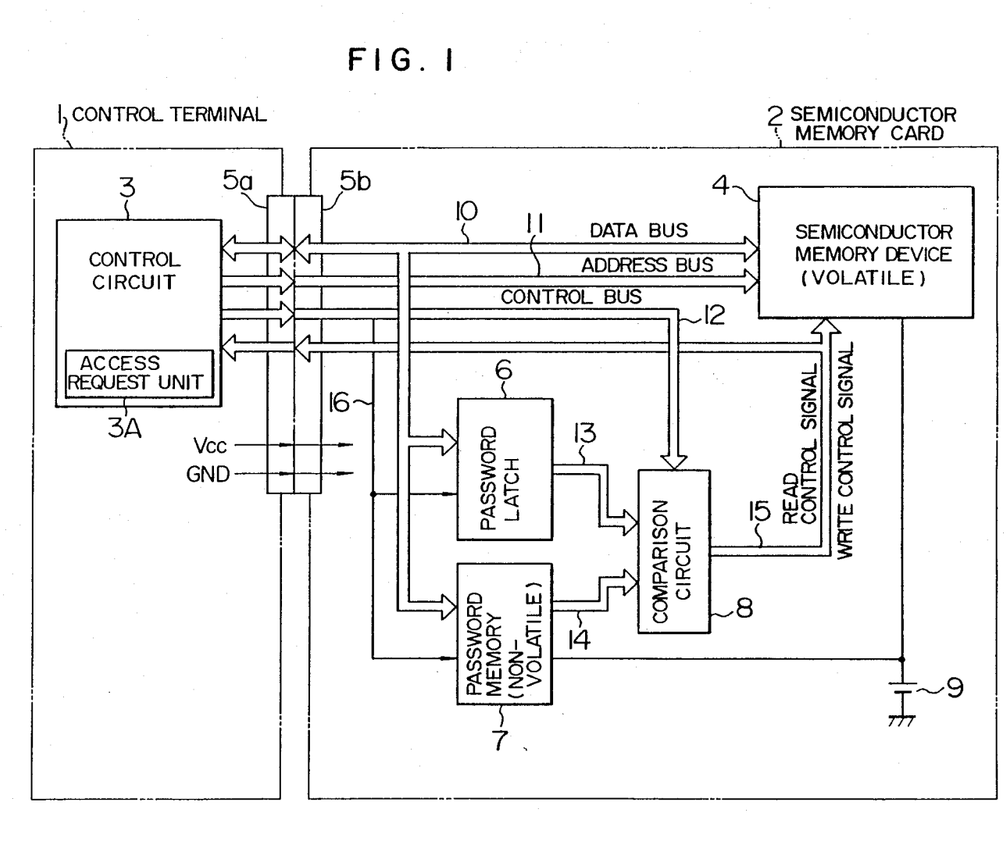
FIG. 1 is a block diagram showing a general circuit arrangement of a semiconductor memory unit or apparatus together with a control terminal used for making access to the data stored in the memory unit.

FIG. 1 shows in a block diagram a general arrangement of a semiconductor memory unit according to an embodiment of the invention together with a control terminal used for making access to the data stored in the memory unit. In the figure, a reference numeral 1 denotes the control terminal, 2 denotes the semiconductor memory unit implemented in the form of a card or cartridge, 3 denotes a control circuit, 4 denotes a semiconductor memory device incorporated in the card, 5a and 5b denote connectors, 6 denotes a password latch incorporated in the card, 7 denotes a password memory, 8 denotes a comparison circuit, 9 denotes a memory back-up battery serving as a power source for supplying electric power to the volatile semiconductor memory device 4, 10 denotes a data bus, 11 denotes an address bus, 12 denotes a control bus for transmitting control signals required upon making access to the semiconductor memory device 4, numerals 13, 14 and 15 denote output lines and finally a numeral 16 denotes a control line branched from the control bus 12.

Referring to FIG. 1, the semiconductor memory card or cartridge 2 is adapted to be inserted removably in the control terminal 1. When the semiconductor memory card 2 is placed in the control terminal 1, electrical connection is established between the memory card 2 and the control terminal 1 through the connectors 5a and 5b. The semiconductor memory device 4 can be accessed by the addressing signal and the control signal supplied from the control circuit 3 through the address bus 11 and the control bus 12, wherein data writing and reading operations as well as data transfer between the semiconductor memory device 4 and the control circuit 3 are performed through the bidirectional data bus 10.

In the case of the illustrated embodiment, the semiconductor memory device 4 is implemented as a random access memory or RAM. Accordingly, when the semiconductor memory card 2 is removed from the control terminal 1, the semiconductor memory device 4 is backed up by the memory backup power supply source 9 so that data written in the semiconductor memory device 4 can be maintained however, it should be appreciated that the semiconductor memory device 4 is not restricted to a RAM but can be implemented in other forms, such as erasable programmable read-only memory (EPROM), electrically erasable programmable read-only memory (EEPROM), mask read-only memory (MROM) or the like.

On the other hand, the password memory 7 also constituted by a semiconductor memory device is initially loaded with a password and a flag through the data bus 10 and the control line 16 by a particular control terminal authorized to perform the password writing operation. Usually, the word length of a password corresponds to 4 to 10 places in the decimal number, and the flag is of two bit data length. Accordingly, the password memory 7 can be realized with the storage capacity of 2 to 5 bytes. The operation modes to be inhibited by using the password are the data write mode and the data read mode, respectively. Thus, one bit of the flag corresponds to the data write mode with the other bit corresponding to the data read mode. Now, it is assumed that the flag is represented by a bit combination ($F_R$, $F_W$), where the bit $F_R$ is allocated to the read mode with the $F_W$ being allocated to the write mode and that the bit of "1" represents inhibition of the corresponding mode with the bit of "0" enabling the corresponding mode. On this assumption, the flag assumes the values listed in the following table 1 in dependence on the modes to be inhibited.

TABLE 1

| MODE TO BE INHIBITED | FLAG |
|---|---|
| Write Mode Only | 01 |
| Read Mode Only | 10 |
| Both of Write and Read Modes | 11 |

Accordingly, when the mode to be inhibited is, for example, "read mode only", the flag to be stored in the password memory assumes the value "1, 0". In this case, writing of data can be performed freely.

When the semiconductor memory unit or card 2 is connected to the control terminal 1, the password memory sends out constantly the password (hereinafter referred to as the set password) together with the flag onto the output line 14 in the form of parallel bit data.

Figure 3A:
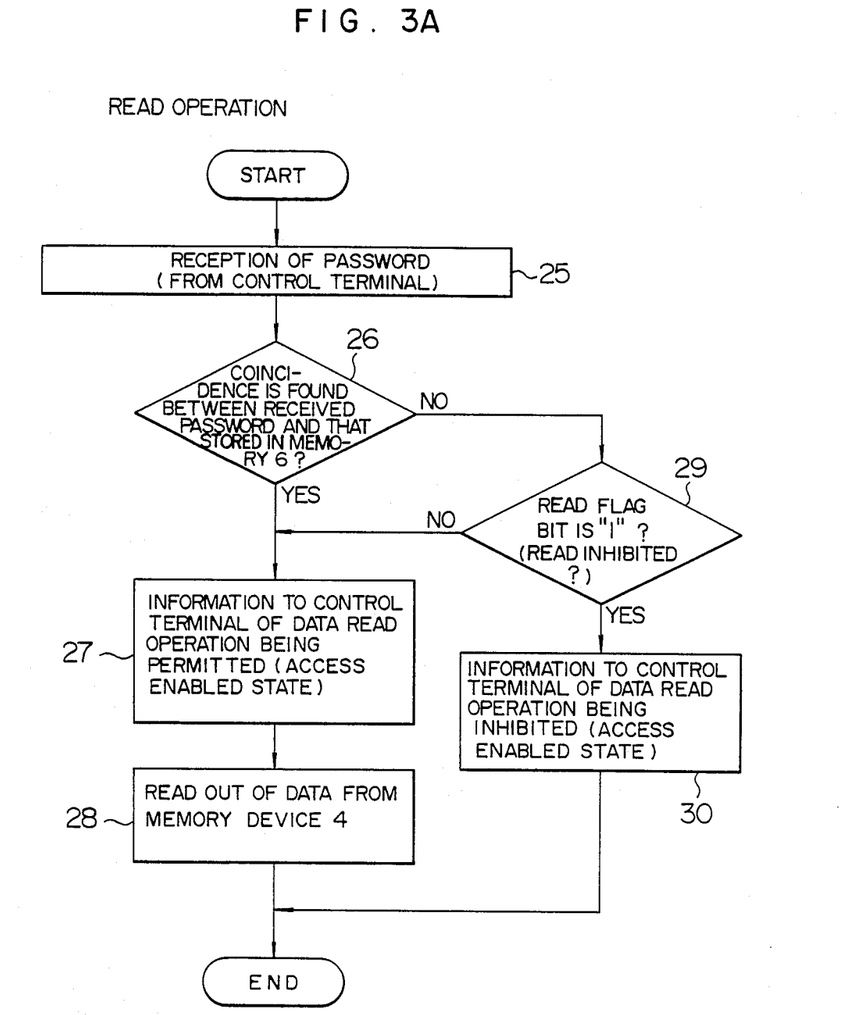
FIGS. 3A and 3B are flow charts illustrating procedures for making decision as to whether access to an incorporated semiconductor memory device are to be inhibited or permitted in read and write modes, respectively.

It is now assumed that only the flag (1, 0) representative of inhibition only of the read mode is stored in the flag area of the password memory 7. On this assumption, when an access request signal for reading out data from the semiconductor memory device 4 and a password identifying the person requesting the access are received by an access request unit 3A of the control circuit 3, the latter sends out the input password onto the data bus 10 while sending out a read control signal and a latch signal onto the control bus 12 (FIG. 3A, step 25). The input password on the data bus 10 is latched by the password latch 6 in response to the latch signal supplied through the control line 16. The password latch 6 outputs the input password onto the output line 13, which password is supplied to the comparison circuit 8 to be compared with the set password applied through the output line 14 of the password memory 7 (FIG. 3A, step 26). This set password identifies a person who is exceptionally admitted to access the semiconductor memory device 4 for reading or writing data therefrom or thereto and is previously defined. The access request unit 3A should preferably be equipped with a display and/or keyboard.

The comparator circuit 8 is additionally connected to the control line 12 and is supplied with the read control signal through the control line 12. When the input password coincides with the set password, the read control signal is outputted onto the output line 15 from the comparison circuit 8, whereby the semiconductor memory device 4 is set to the state to allow the data read operation to be performed (FIG. 3A, step 27). The abovementioned read control signal is also supplied to the control circuit 3, which responds to this read control signal to decide that the data reading operation is permitted. Thus, the control circuit 3 can send an address signal to the semiconductor memory device 4 through the address bus 11 and read out desired data from the semiconductor memory device 4 through the data bus 10 (FIG. 3A, step 28).

On the other hand, when a discrepancy is found between the input password and the set password, the comparator circuit 8 can not produce the enabling control signal on output line 15 (FIG. 3A, step 30), since it is determined that the flag indicating the inhibition of only the read mode is stored in the password memory 7 at a decision step 29 of FIG. 3A. As the consequence, the semiconductor memory device is not set to the state which allows data to be read out therefrom. Thus, the control circuit 3 makes a decision that the data reading from the semiconductor memory device 4 is inhibited.

Figure 3B:
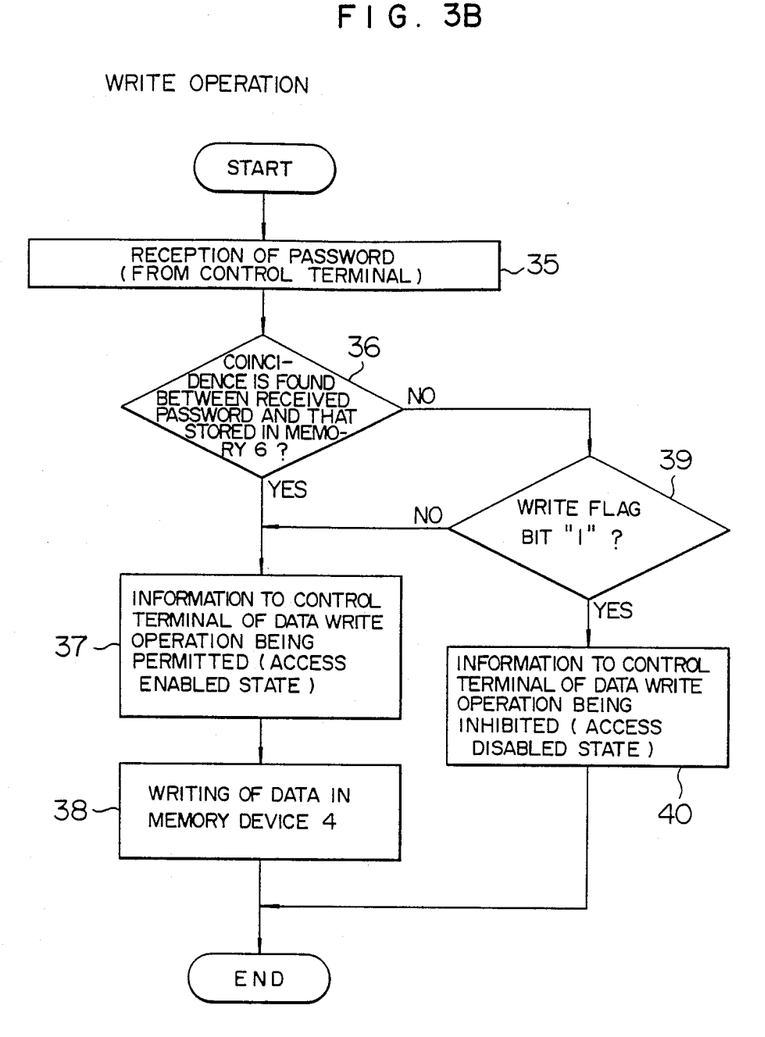

Now, the description will turn to the data writing operation for the semiconductor memory device 4 on the same assumption made hereinbefore. At first, through the similar procedure taken in the data reading operation described above, an input password is latched by the password latch 6. Subsequently, an operation set forth in block 37 shown in FIG. 3B is carried out independent of whether the input password coincides with the set password, resulting in the write control signal sent out through the control line 12 from the control circuit 3 being outputted on the output line 15 by the comparator circuit 8. In this manner, the data writing operation to the semiconductor memory device 4 is always permitted (FIG. 3B, step 38).

As will be understood from the above description, when the flag indicating the inhibition only of the data reading operation is stored in the password memory 7 at the flag area, the operation of reading out data from the semiconductor memory device 4 is permitted only when coincidence is detected between the input password and the set password, although the data writing operation to the semiconductor memory device is always permitted.

Conversely, assuming that the flag (0, 1) indicative of inhibition only of the data writing operation is set in the password memory 7, the data writing operation to the semiconductor memory 4 is permitted (FIG. 3B, step 37) only when coincidence is confirmed between an input password and the set password (FIG. 3B, step 36), although the operation for reading out data from the semiconductor memory device is always permitted through the decision routine including the steps 26 and 29 (FIG. 3A) regardless of whether or not an input password coincides with the set password.

Finally, when the flag (1, 1) indicating inhibition of both reading and writing operations is set in the password memory 7, neither the operation for writing data in the semiconductor memory device 4 nor the operation for reading data therefrom is permitted unless coincidence is found between an input password and the set password.

As will now be appreciated, it is possible to prevent the semiconductor memory device 4 from erroneous data erasure and inadvertent data rewriting by using the password and the flag in the manner described above. Additionally, protection of confidentiality of the data stored in the semiconductor memory device 4 can be assured. The password memory 7 may be realized by using a memory of very small capacity. The password latch 6 can also be constituted by a conventional parallel data latch. The comparator circuit 8 can be implemented in a relatively simple logic configuration. An exemplary embodiment of the comparator circuit 8 will be described below by referring to FIG. 2. In this figure, reference symbols 12R and 12W denote control lines, 14P, 14R and 14W denote output item signals from the password memory 7, symbols 15R and 15W denote output lines for finishing signals representative of the result of comparsion, 17 denotes a coincidence circuit, 18 and 19 denote AND gates, and numerals 20 and 21 denote OR gates. Further, like reference symbols are used to denote same parts of the system shown in FIG. 1 for simplifying the description.

Figure 2:
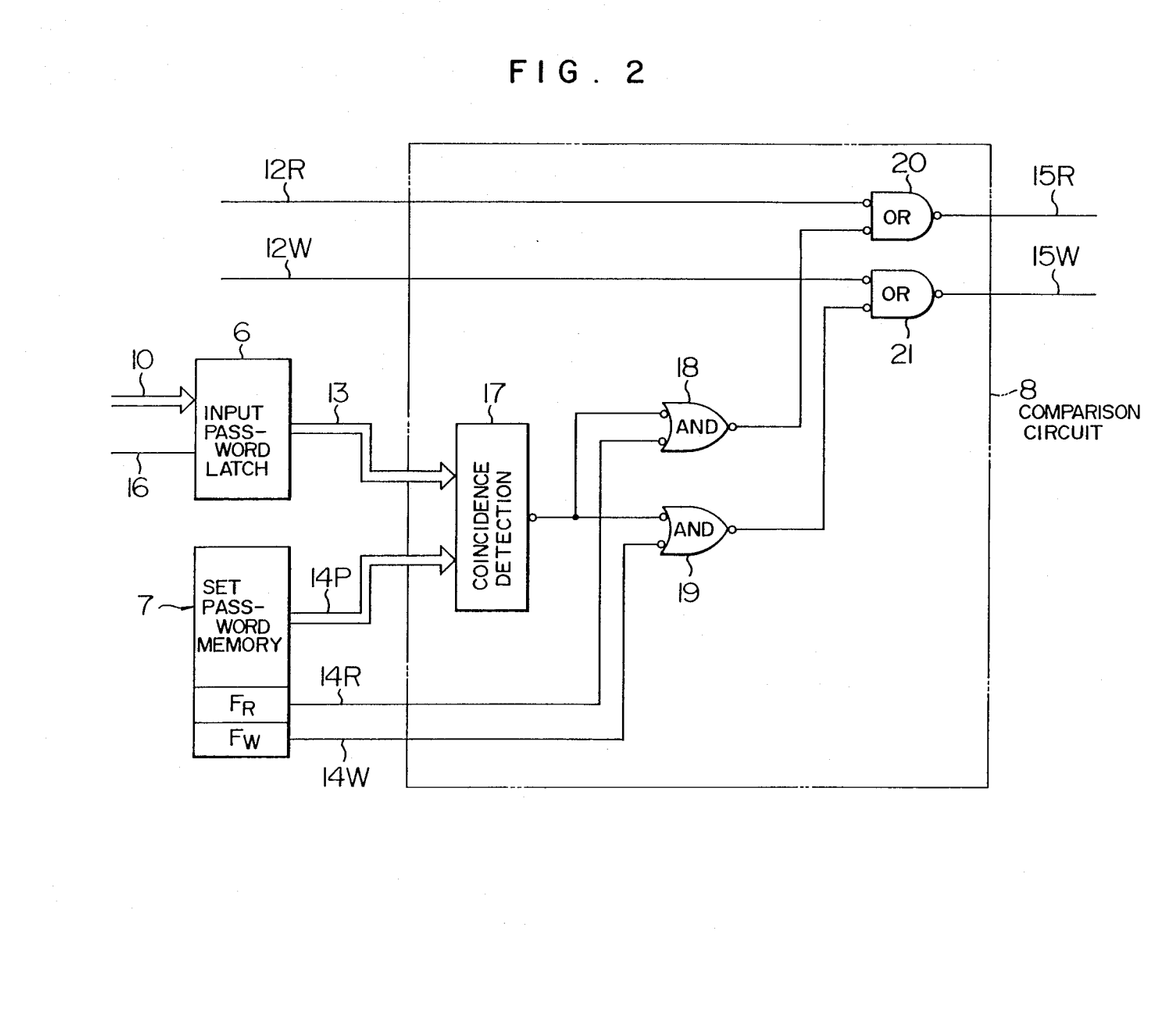
FIG. 2 is a block diagram showing a circuit configuration of a comparator employed in the memory unit shown in FIG. 1.

Referring to FIG. 2, the set password produced on the output line 14P of the password memory 7 is supplied to one input of the coincidence circuit 17 constituting a part of the comparataor circuit 8. The coincidence circuit 17 receives at the other input the latched input password from the password latch 6. Upon coincidence being found between the input password and the set password, the coincidence circuit 17 outputs a signal of logic "0" and otherwise produces a signal of logic "1". This output signal of the coincidence circuit 17 is applied to one input of the AND gates 18 and 19, respectively.

The password memory 7 further stores the two-bit flag having the bit $F_R$ indicating inhibition of the data reading operation and the $F_W$ bit indicating inhibition of the data writing operation. The read inhibit bit $F_R$ signal is supplied to the other input of the AND gate 18 by way of the bit output line 14R, while the write inhibit bit $F_W$ is supplied to the other input of the AND gate 19 through the output line 14W. The output signal of the AND gate 18 is applied to one input of the OR gate 20 which receives at the other input thereof the read control signal supplied over the control line 12R. On the other hand, the output signal of the AND gate 19 is applied to one input of the OR gate 21 which receives at the other input thereof the write control signal supplied through the control line 12W.

It is assumed that the semiconductor memory device 4 (see FIG. 1) is set to the read mode when the read control signal applied through the control line 12R is logic "0", while the memory device 4 is set to the write mode in response to the write control signal of logic "0" applied through the control line 12W. Thus, when the read control signal produced on the output line 15R connected to the output of the OR gate 20 is logic "0", the semiconductor memory device 4 is set to the data read mode, and the control circuit 3 (see FIG. 1) decides that operation of reading out data from the semiconductor memory device 4 is permitted or enabled. On the other hand, when the write control signal outputted on the output line 15W by the OR gate 21 is logic "0", the semiconductor memory device 4 is set to the data write mode, whereupon the control circuit 3 decides that operation of writing data to the semiconductor memory device 4 is enabled.

Now, description is turned to the operation of the comparator circuit 8 on the assumption that the flag (1, 0) whose bits $F_R$ and $F_W$ are "1" and "0", respectively, is set in the password memory 7, as indicated in the table 1.

When it is desired to read out data from the semiconductor memory device 4, an input password as loaded through the access request unit 3A (see FIG. 1) is latched by the password latch 6. At that time, the read control signal on the control line 12R is logic "0", while the write control signal on the control line 12W is logic "1". When the input password coincides with the set password stored in the password memory, the output signal of the coincidence circuit 17 is logic "0". The following truth value table holds true for each of the AND gates 18 and 19.

TABLE 2

| INPUT 1 | INPUT 2 | OUTPUT |
|---------|---------|--------|
| 0 | 0 | 0 |
| 1 | 0 | 0 |
| 0 | 1 | 0 |
| 1 | 1 | 1 |

Accordingly, both outputs of the AND gates 18 and 19 are logic "0". On the other hand, the truth value table for the OR gates 20 and 21 is as follows:

TABLE 3

| INPUT 1 | INPUT 2 | OUTPUT |
|---------|---------|--------|
| 0 | 0 | 0 |
| 1 | 0 | 1 |
| 0 | 1 | 1 |
| 1 | 1 | 1 |

Thus, the read control signal outputted from the OR gate 20 onto the output line 15R is logic "0", while the write control signal outputted from the OR gate 21 on the output line 15W is logic "1". Consequently, it is possible to read out data from the semiconductor memory device 4.

Similarly, when the data writing operation to the semiconductor memory device 4 is to be performed upon detection of coincidence between the input password and the set password, the read control signal on the control line 12R is logic "1", while the write control signal on the control line 12W is logic "0". Since output signals of both the AND gates 18 and 19 are logic "0", the read control signal outputted on the output line 15R from the OR gate 20 is logic "1", while the write control signal outputted on the output line 15W from the OR gate 21 is logic "0". Thus, the data write operation to the semiconductor memory device 4 is enabled.

On the other hand, unless the input password coincides with the set password, the output signal of the coincides circuit 17 is logic "1". Since the flag bits are "1, 0", the output signal of the AND gate 18 is logic "1" with that of the AND gate 19 being logic "0", as can be seen from the table 2 recited hereinbefore. Consequently, the read control signal outputted on the output line 15R from the OR gate 20 is set to logic "1", as is apparent from the table 3. It is thus impossible to read data from the semiconductor memory device 4 under this condition. In contrast, the write control signal outputted on the output line 15W from the OR gate 11 is logic "0" when the write controlsi gnal on the control line 12W is "0". In this case, the data writing operation to the semiconductor memory device 4 is enabled.

In this manner, in case the read inhibit flag (1, 0) is set in the password memory 7, operation of reading out data from the semiconductor memory device 4 is enabled only when the input password coincides with the set password, while the data write operation to the memory 4 is always enabled.

Similarly, in case the write inhibit flag (0, 1) is set in the password memory 7, both operations of writing and reading data to and from the semiconductor memory 4 are enabled, if the input password coincides with the set password, since then the outputs of the AND gates 18 and 19 are both logic "0". However, unless coincidence is found between the input password and the set password, the output of the AND gate 18 is logic "0" with that of the AND gate 19 being "1", whereby the data writing operation to the semiconductor memory device 4 is inhibited.

When the write and read inhibit flag (1, 1) is set in the password memory 7, the output signals of the AND gates 18 and 19 are both logic "0" upon detection of coincidence between the input password and the set password, while the output signals of these AND gates 18 and 19 are both logic "1" when no coincidence is found between the input password and the set password. Accordingly, so long as no coincidence is detected between the input password and the set password, neither operation of writing data to the semiconductor memory nor operation of reading out data therefrom is enabled.

The operations taking place upon discrepancy between an input password and the set password as described above are summarized in the following table 4.

TABLE 4

| FLAG | READ CONTROL SIGNAL ON LINE 12R | WRITE CONTROL SIGNAL ON LINE 12W | WRITE OPERATION | READ OPERATION |
|------|---------------------------------|----------------------------------|-----------------|----------------|
| 01 | 1 | 0 | Inhibited | |
| 10 | 1 | 0 | Permitted | |
| 11 | 1 | 0 | Inhibited | |
| 01 | 0 | 1 | | Permitted |
| 10 | 0 | 1 | | Inhibited |

TABLE 4-continued

| FLAG | READ CONTROL SIGNAL ON LINE 12R | WRITE CONTROL SIGNAL ON LINE 12W | WRITE OPERATION | READ OPERATION |
|---|---|---|---|---|
| 11 | 0 | 1 | | Inhibited |

Figure 4:
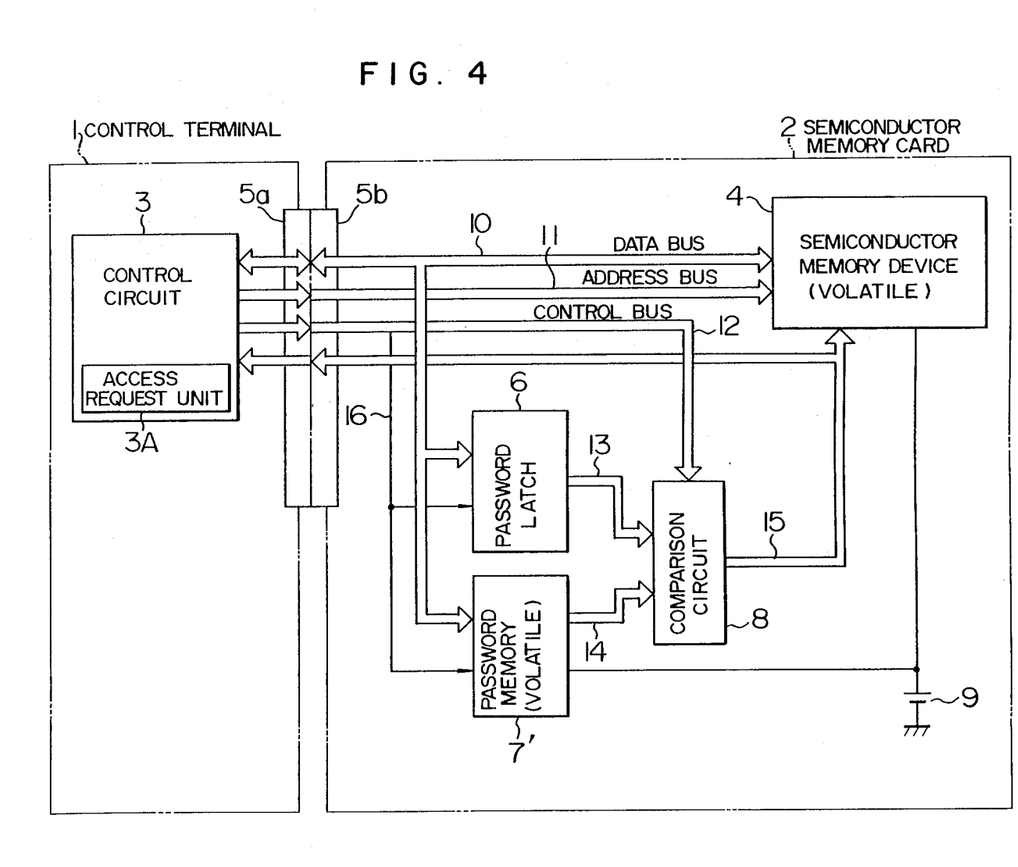
FIG. 4 is a block diagram showing an arrangement of a semiconductor memory unit according to another embodiment of the invention.

Although the password memory 7 can be constituted by a semiconductor memory such as a mask read-only memory, erasable programmable read-only memory (EPROM) or electrically erasable programmablel read-only memory (EEPROM), it goes without saying that a random access memory (RAM) may also be employed as the password memory 7. In this case, however, it is required to back up the password memory 7 by the power supply source 9 intended inherently for backing up the semiconductor memory device 4 so that the contents stored in the password memory 7 can be sustained, as shown in FIG. 4, even after the semiconductor memory unit 2 has been disconnected from the control terminal 1.

As will be appreciated from the foregoing description, by implementing the password comparison decision means in the fixed logic circuit configuration, the number of transistors as required can be decreased by a factor of 1/1000 when compared with the case in which a microprocessor is employed for executing the decision procedure for identifying the password. Besides, a program as well as a memory for the storage thereof otherwise required is rendered unnecessary, which in turn means that the space occupied by the password comparison/identification means can be reduced significantly when compared with the case in which the microprocessor is used, not to speak of remarkable reduction in the manufacturing cost.

Figure 5:
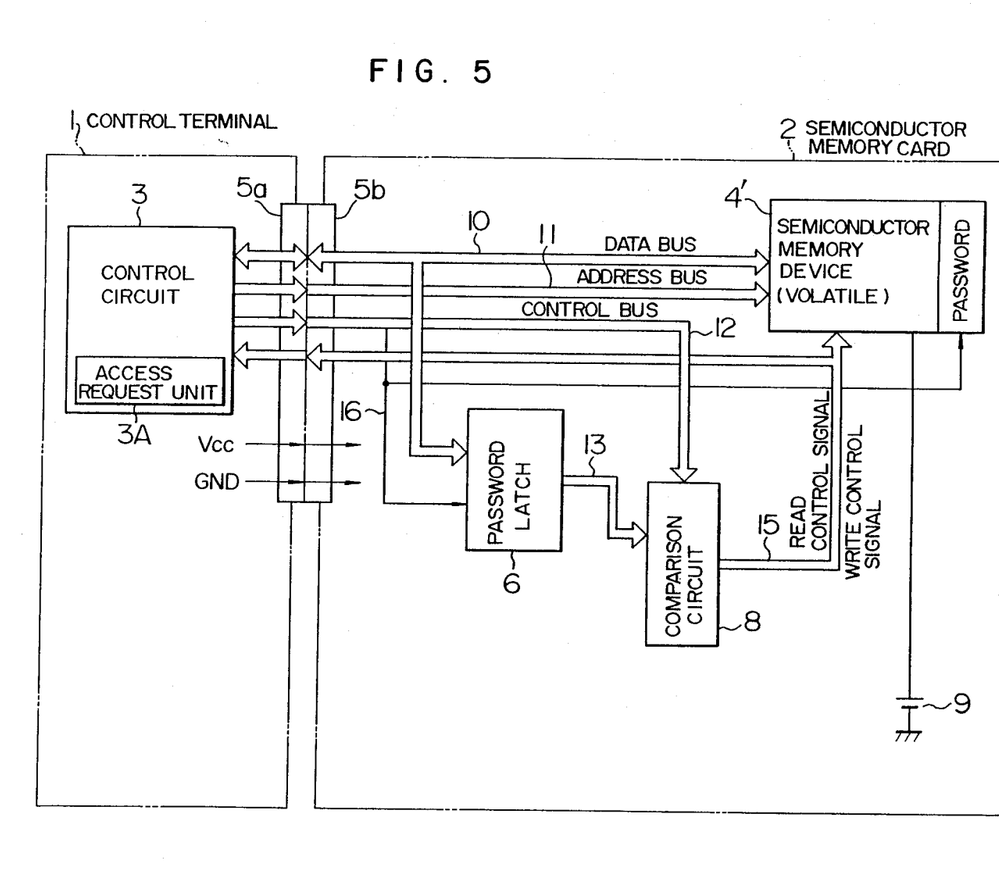
FIG. 5 is a view similar to FIG. 4 and shows a semiconductor memory unit according to another embodiment of the invention.

FIG. 5 shows another embodiment of the invention in which the password memory is implemented in one and the same semiconductor chip as the volatile semiconductor memory 4', wherein both memories are backed up by a common DC power source. Operation of this embodiment is substantially same as that of the embodiment shown in FIG. 1. The control line 16 for setting the password and the flag is connected to the password portion of the volatile semiconductor memory device 4'. The memory 4' may be constituted not only by a RAM but also by EPROM or EEPROM, wherein the function for protecting the read-only semiconductor memory device can be performed with the aid of the password in the manner described hereinbefore.

It should be understood that the protecting function according to the present invention can be equally realized for optomagnetic storage systems and optical storage card.

We claim:

1. A data storage cartridge destined to be used in a control terminal having means for allowing access to data stored in said data storage cartridge, comprising:
   (a) a memory device implemented as a mass storage memory;
   (b) a data bus and an address bus for transmitting data and address information for writing and reading data in and from said memory device, respectively;
   (c) flag means indicating a mode of inhibiting either access for reading the data from said memory device or access for writing data in said memory device;
   (d) a password memory for storing a particular password for making decision to permit access to said memory for reading data therefrom or writing data therein independent of the inhibition flag being set;
   (e) latch means for holding a password inputted from said control terminal in precedence to making access to said memory device; and
   (f) comparison means connected to said latch means and said password memory for producing a control signal for controlling access to said memory device when coincidence is found between said input password held by said latch means and said particular password stored in said password memory.

2. A memory apparatus comprising:
   a memory accessible externally for allowing data to be written therein or read out therefrom;
   password memory means for storing a set password;
   password latch means for storing temporarily an input password loaded externally; and
   comparison means for comparing said set password and said input password with each other and for allowing said memory to be used for a predetermined mode or inhibiting said memory from being used for said predetermined mode;
   said password memory includes means for stsoring flags which indicate inhibition only of unlimited use of a data write mode of said memory, inhibition only of unlimited use of a data read mode of said memory or inhibition of unlimited use of both data write and data read modes of said memory; and
   said comparision means includes means for inhibiting only the use of the mode or modes indicated by the flags stored in said password memory means upon detection of discrepancy between said input password and said set password.

3. A memory apparatus according to claim 2, wherein said memory is constituted by a semiconductor random access memory (RAM).

4. A memory apparatus according to claim 2, wherein said password memory means is constituted by a nonvolatile memory selected from a group consisting of a mask read-only memory (MROM), an erasable programmable read-only memory (EPROM) and an electrically erasable programmable read-only memory (EEPROM).

5. A memory apparatus according to claim 2, wherein said password memory means is constituted by a semiconductor RAM.

6. A memory apparatus according to claim 2, wherein said flags constitute two data bits, one bit of which corresponds to the data write mode, while the other bit corresponds to the data read mode.

7. A data storage cartridge for use in a control terminal having means for allowing access to data stored in said data storage cartridge, comprising:
   (a) a memory device implemented as a mass storage memory;
   (b) a data bus and an address bus for transmitting data and address information for writing and reading data in and from said memory device, respectively;
   (c) flag means for setting inhibition flags indicating a mode of inhibiting either access for reading the data from said memory device or access for writing data in said memory device;

(d) password memory means for storing a particular password for determining whether access to said memory for reading data therefrom or writing data therein is to be permitted dependent upon the inhibition flag set by said flag means;

(e) latch means for holding a password inputted from said control terminal in precedence to making access to said memory device; and (f) comparison means connected to said flag means, said latch means and said password memory for producing a control signal for controlling access to said memory device when coincidence is found between said input password held by said latch means and said particular password stored in said password memory and said flag means indicates a mode of inhibiting said access.

8. A data storage cartridge according to claim 7, wherein said comparison means includes means for supplying a control signal for controlling read/write operations received from said control terminal to said memory device only when coincidence is detected between said input password and said particular password and said flag means indicates a mode of inhibiting said operations.

9. A data storage cartridge according to claim 7, wherein said memory device, said flag means and said password memory are realized in a same semiconductor chip.

10. A data storage cartridge according to claim 7, wherein said memory device is constituted by a programmable read-only memory (PROM).

11. A data storage cartridge according to claim 7, wherein said memory device is constituted by an electrically erasable programmable read-only memory (EEPROM).

12. A data storage cartridge according to claim 7, wherein said memory device is constituted by an optical storage medium.

13. A method of protecting selectively data stored in a mass memory device incorporated in a portable memory card when said memory device is accessed in a state in which said portable memory card is placed in a terminal apparatus, comprising the steps of:

(a) setting in said memory card a flag indicative of inhibition of unlimited access to a mass memory incorporated in said memory card for a data write operation, a data read operation or both data read and write operations;

(b) loading a particular authorized password in a password memory incorporated in said memory card;

(c) holding in a latch incorporated in said memory card a password inputted by an operator;

(d) comparing contents of said latch and said password memory with each other; and (e) inhibiting access to said mass memory for a data read/write operation when said comparison results in no coincidence only when said inhibit flag is set.

14. A method according to claim 13, further including a step of supplying an access control signal applied externally of said memory card to said mass memory for accessing data stored therein when access to said mass memory is not inhibited.

15. A memory apparatus comprising:

a memory accessible externally for allowing data to be written therein or read out therefrom;

password memory means for storing a set password;

password latch means for storing temporarily an input password loaded externally;

comparison means for comparing said set password and said input password with each other and for controlling the setting of said memory to a predetermined mode capable of reading or writing data externally according to an access instruction to said memory in response to the result of said comparing; and flag means for storing a flag which indicates inhibition only of a data write mode of said memory or a flag which indicates inhibition only of a data read mode of said memory, wherein said comparison means includes means responsive to a flag stored in said flag means when said input password does not coincide with said set password for inhibiting said memory from being set to a mode requested by said access instruction if said flag indicates an inhibited mode and for allowing said memory to be set to a mode requested by said access instruction if said flag indicates a mode which is not inhibited.

* * * * *